(12) United States Patent
Potter et al.

(10) Patent No.: US 7,245,615 B1
(45) Date of Patent: Jul. 17, 2007

(54) MULTI-LINK PROTOCOL REASSEMBLY ASSIST IN A PARALLEL 1-D SYSTOLIC ARRAY SYSTEM

(75) Inventors: Kenneth H. Potter, Raleigh, NC (US); Michael L. Wright, Raleigh, NC (US); Hong-Man Wu, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1025 days.

(21) Appl. No.: 10/021,714

(22) Filed: Oct. 30, 2001

(51) Int. Cl.
*H04L 12/28* (2006.01)
*H04L 12/56* (2006.01)

(52) U.S. Cl. .................. 370/389; 370/386; 370/390; 370/391; 370/394; 370/412; 370/413; 370/414; 370/426; 709/230; 709/250

(58) Field of Classification Search ............... None
See application file for complete search history.

(56) References Cited

U.S. PATENT DOCUMENTS

| | | | | |
|---|---|---|---|---|
| 5,337,313 A | * | 8/1994 | Buchholz et al. | ............ 370/394 |
| 5,396,490 A | * | 3/1995 | White et al. | ................. 370/474 |
| 5,440,545 A | * | 8/1995 | Buchholz et al. | ............ 370/426 |
| 5,987,034 A | | 11/1999 | Simon et al. | |

OTHER PUBLICATIONS

U.S. Appl. No. 09/791,062, Gary S. Muntz.
U.S. Appl. No. 09/791,063, Rachepalli, et al.
Franks, N., "Multilink Frame Relay", http://www.frforum.com/4000/whitepapers/MFRwhitepaper.pdf, Jan. 16, 2001, pp. 1-8.
End-to-End Multilink Frame Relay Implementation Agreement, FRF, 15, Frame Relay Forum Technical Committee, Aug. 1999, pp. 1-8.
K. Sklower, et al., The PPP Multilink Protocol (MP), Request for Comments: 1990, Network Working Group, Internet Engineering Task Force, pp. 1-24.
Bormann, C., The Multi-Class Extension to Multi-Link PPP, Request for Comments: 2686, Network Working Group, Internet Engineering Task Force, (c) 1999, pp. 1-11.

* cited by examiner

*Primary Examiner*—Raj K. Jain
(74) *Attorney, Agent, or Firm*—Cesari & McKenna, LLP

(57) ABSTRACT

The present invention comprises a technique for performing a reassembly assist function that enables a processor to perform packet reassembly in a deterministic manner. The technique employed by the present invention enables a processor to reassemble a packet without having to extend its normal processing time to reassemble a varying number of fragments into a packet. The invention takes advantage of the fact that the reassembly assist can be dedicated exclusively to reassembling a packet from a series of fragments and thereby offloading the reassembly process from the processor.

29 Claims, 13 Drawing Sheets

| PACKET PER 50ms @64B | LINK PER BUNDLE | MAX Pkt STORED PER BUNDLE | ALLOCATED ENTRY PER BUNDLE | ACTUAL DELAY IN ms | MAX # OF BUNDLE | REQUIRED TABLE ENTRY SIZE | ALLOCATED TABLE ENTRY SIZE | TOTAL MEMORY IN BYTE |
|---|---|---|---|---|---|---|---|---|
| 150 | 2 | 150 | 256 | 85.33 | 1250 | 187500 | 332000 | 2560000 |
| 150 | 3 | 300 | 512 | 85.33 | 833 | 250000 | 426667 | 3413333 |
| 150 | 4 | 450 | 512 | 56.89 | 625 | 281250 | 332000 | 2560000 |
| 150 | 5 | 600 | 1024 | 85.33 | 500 | 300000 | 512000 | 4096000 |
| 150 | 6 | 750 | 1024 | 68.27 | 417 | 312500 | 426667 | 3413333 |
| 150 | 7 | 900 | 1024 | 56.89 | 357 | 321429 | 365714 | 2925714 |
| 150 | 8 | 1050 | 1024 | 48.76 | 313 | 328125 | 320000 | 2560000 |
| 150 | 9 | 1200 | 2048 | 42.67 | 278 | 333333 | 284444 | 2275556 |
| 150 | 10 | 1350 | 2048 | 75.85 | 250 | 337500 | 512000 | 4096000 |

FIG. 8b

MULTI-LINK PROTOCOL REASSEMBLY ASSIST IN A PARALLEL 1-D SYSTOLIC ARRAY SYSTEM

BACKGROUND OF THE INVENTION

1. Field of the Invention

The present invention relates to systolic arrays and, in particular, to a reassembly assist for a systolic array of a router used in a computer network.

2. Background Information

A class of data networking equipment, referred to as aggregation or edge routers, has emerged that aggregates thousands of physical or logical links from end users onto one or more higher speed "backbone" links (such as OC-12, Gigabit Ethernet, OC-48 and higher) of a computer network. As the name implies, these routers reside at the edge of the network and are "gatekeepers" for packets transmitted over the high-speed core of the network. As such, they are required to perform a list of advanced "high-touch" features on the packets to protect the network from unauthorized use and to deal with a wide range of unique link interfaces, protocols and encapsulation methods that the end user links require. In order to provide these complex features and to provide flexibility for newly defined features, these routers are normally implemented using specialized, programmable processors.

The sheer processing power and memory bandwidth required to access data structures (e.g., tables) in order to process packets dictates the use of multiple processors within an edge router. A common approach is to organize these processors into one or more parallel one-dimensional (1-D) systolic arrays wherein each array is assigned an incoming packet to process. Each processor within a single systolic array "pipeline" is assigned a piece of the task of processing the packet and therefore only needs access to a memory associated with that task. However, the corresponding processors in other parallel 1-D arrays that are performing the same tasks may also share that same memory. Furthermore, each processor has a limited amount of time (allotted phase) to process its packet without impacting the flow of packets through the system and negatively impacting packet throughput.

Aggregation routers of this class often provide support for multi-link protocols. A multi-link protocol is used to aggregate multiple physical links into a single logical link. Multi-link protocols enable parallel lower speed links to be combined such that they act together as one higher speed link. The combining of links is called bundling and the group of multiple physical links that are combined into a single logical link is called a bundle. Bundling provides the benefits of the combined bandwidth of the aggregated physical links, but with substantially less latency of any one individual physical link. In addition, greater service resilience is provided because the bundle continues to function even when individual links within the bundle fail. Two examples of multi-link protocols is are the multi-link point-to-point protocol (MLPPP) defined in RFC 1990, *The PPP Multi-link Protocol*, and the multi-link frame relay protocol (MFR) defined in FRF.15, the *End-to-End Multi-link Frame Relay Implementation Agreement*.

In a multi-link protocol, a packet waiting to be sent on a bundle is often sent on the next available physical link in the bundle. If the packet is large, the packet is typically broken up into a series of fragments (i.e., data fragments) then sent in parallel over different physical links in the bundle. On the receiving end, the fragments are reassembled to form the original packet. By fragmenting packets and sending them in this manner, greater bandwidth can be realized as large packets are sent in parallel and capable of utilizing the capacity of the bundle rather than an individual link. However, one drawback with this method is that fragments may arrive out of order on the receiving end, thereby complicating the process of reassembling the packet.

The reassembly process typically involves tracking fragments and temporarily storing them as necessary until all the fragments have been received. When all the fragments have been received, the packet is typically reassembled by moving each fragment into a packet buffer at a displacement in the buffer that correlates to the displacement of the fragment in the original packet.

The amount of time required to reassemble the packet varies based on the number of fragments that need to be reassembled. In a high throughput systolic array configuration, this variation in time is unacceptable because depending on the number of fragments that need to be reassembled, the processor may not be able to complete the reassembly process within its allotted time phase, thereby possibly stalling other processors in the array. Even if the time phase for the processor was extended to accommodate the worst case largest-sized packet, doing so introduces inefficiencies and wastes valuable processor resources. In addition, having to reassemble a packet when the last packet is received means the processor has to dedicate a greater amount of time to processing the last fragment than it dedicates to processing earlier fragments. Once again this could be remedied by extending the processor phase to accommodate the largest-sized packet, however, as indicated before, doing so wastes valuable resources. It is therefore highly desirable to have a mechanism that makes the packet reassembly process deterministic.

SUMMARY OF THE INVENTION

The present invention comprises a technique for performing a reassembly assist function that enables a processor to perform packet reassembly in a deterministic manner. The reassembly assist function "acts" in an autonomous manner that offloads the process of reassembling a packet from a series of packet fragments from the processor. The technique further enables the processor to reassemble a varying number of fragments into the packet without having to extend its normal processing time. The invention takes advantage of the fact that the reassembly assist can be dedicated exclusively to reassembling the packet from a series of fragments and thereby offload the reassembly process from the processor.

Specifically, the processor maintains a reassembly table and status information for fragments received on a bundle. As fragments are received, the processor tracks the fragments in the reassembly table and keeps status information about the received fragments. The processor uses the status information to determine when the final fragment of a packet has been received. When the final fragment has been received, the processor issues a request to the reassembly assist to reassemble the packet. For each entry in the reassembly table associated with the packet, the reassembly assist locates a fragment packet descriptor associated with the entry and places the contents of the fragment packet descriptor in a packet descriptor that describes the reassembled packet. The packet descriptor can then be used by the queuing and packet logic of the router to further process the packet.

Advantageously, the reassembly assist function offloads the packet reassembly process from the processor. To reassemble a packet, the processor simply issues a request to the reassembly assist. Thus, the amount of time the processor dedicates to reassembling a packet is fixed (i.e., deterministic) regardless of the number of fragments that may be involved. In a systolic array environment, this determinism is essential to ensure the processor can complete its processing within its allotted phase.

BRIEF DESCRIPTION OF THE DRAWINGS

The invention description below refers to the accompanying drawings, of which:

FIG. 8b is a table of reassembly table sizes that can be used to implement the present invention;

DETAILED DESCRIPTION OF AN ILLUSTRATIVE EMBODIMENT

Figure 1:
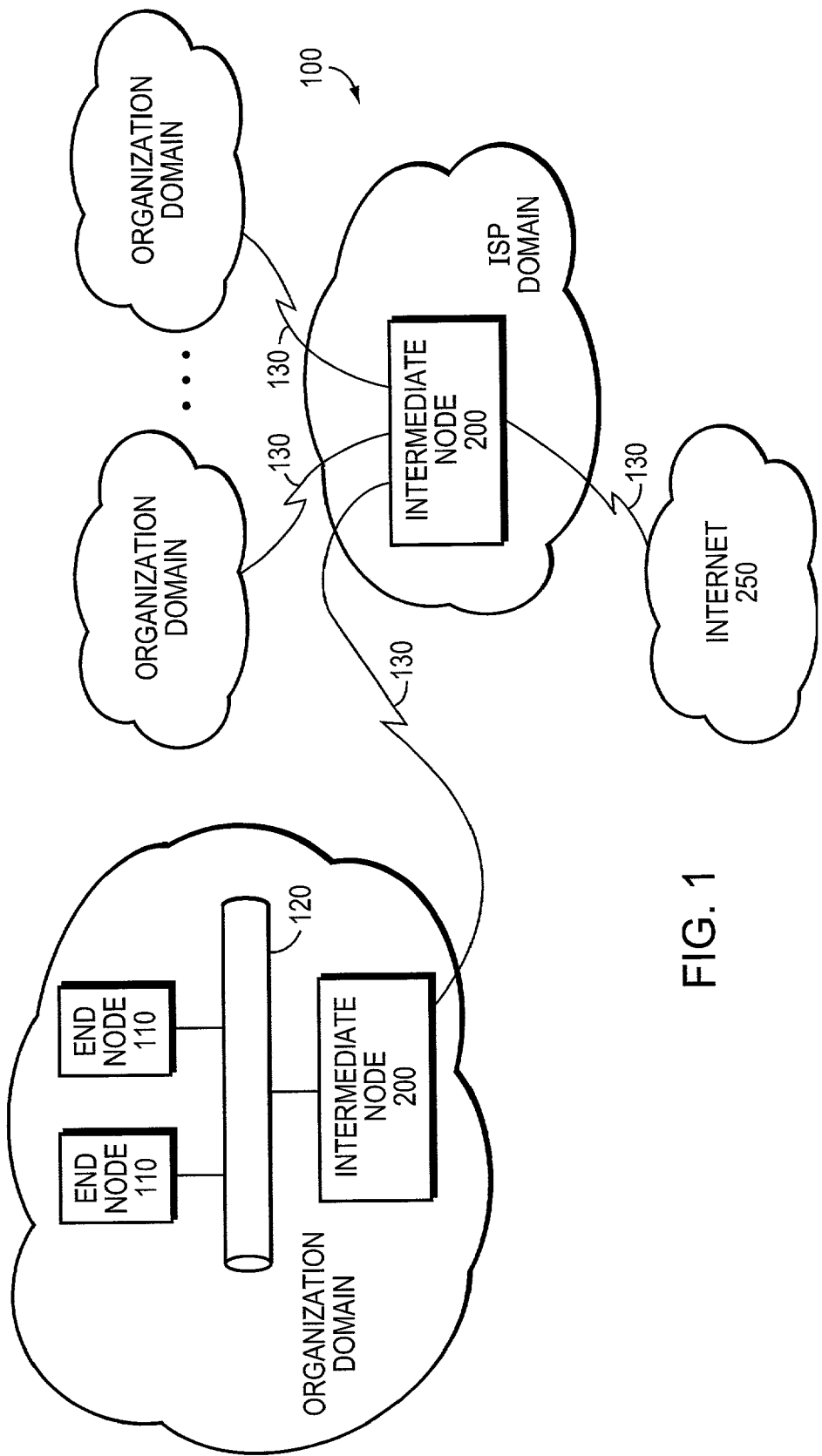
FIG. 1 is a schematic block diagram of a network including a collection of communication links and segments connected to a plurality of end and intermediate nodes.

FIG. 1 is a schematic block diagram of a computer network 100 comprising a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes, such as network switches or routers, to form an internetwork of computer nodes. These internetworked nodes communicate by exchanging data packets according to a predefined set of protocols, such as the Transmission Control Protocol/Internet Protocol (TCP/IP). In addition, depending on the configuration and needs of the network, certain nodes may be configured to run one or more multi-link protocols to accommodate multi-link communication between internetworked nodes.

For purposes of illustration only, the detailed description of the illustrated embodiment is described in terms where the invention is used to process point-to-point protocol (PPP) packets that are fragmented using the multi-link point-to-point protocol (MLPPP). However, it is understood that the present invention is not limited to just this protocol. Rather the present invention could be used with other protocols, such as the Frame Relay multi-link protocol, or in other instances where the reassembly of fragments of data is involved.

Figure 2:
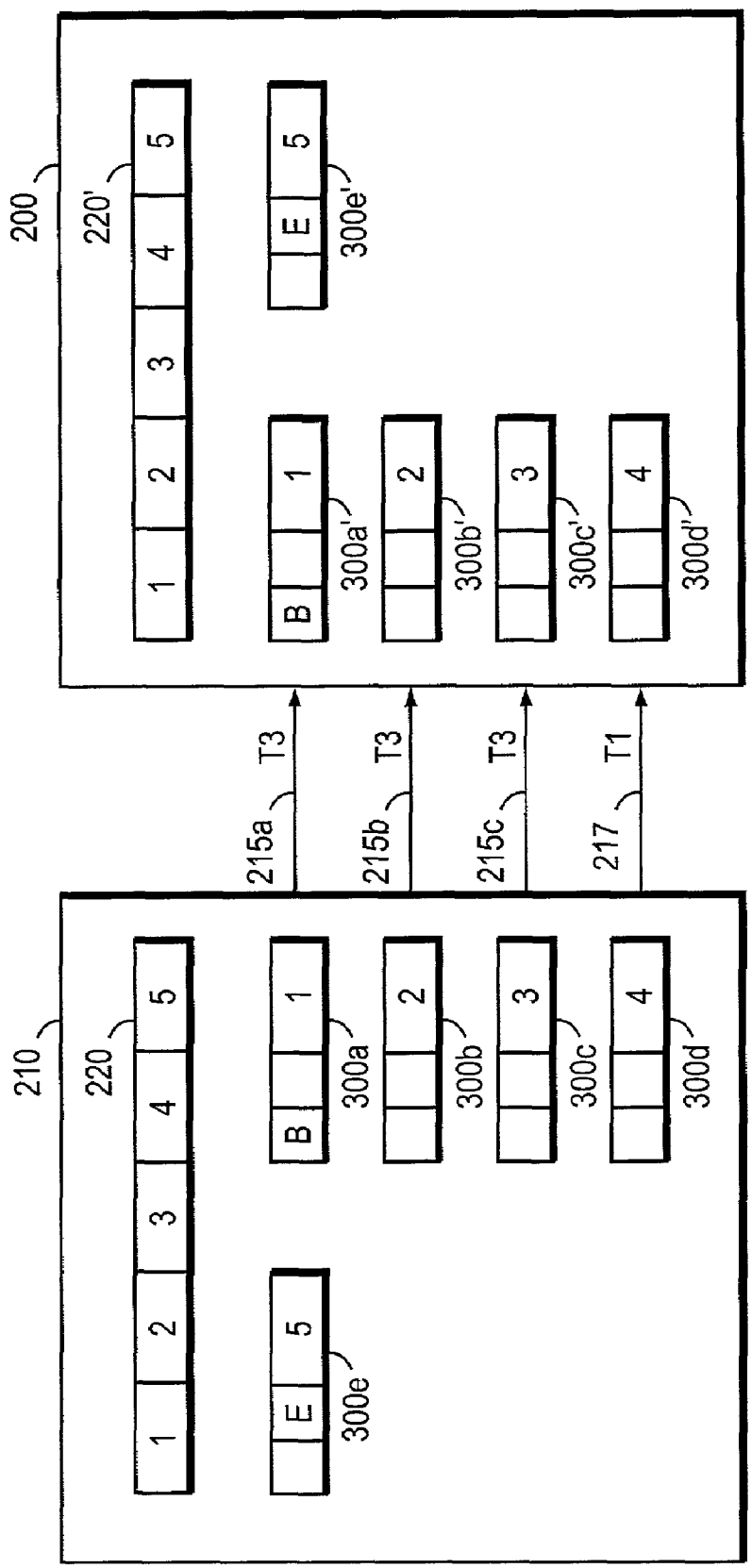
FIG. 2 is an illustration of the operation of a multi-link protocol bundle.

A system configured to run a multi-link protocol such as MLPPP, typically has one or more links configured to operate as a bundle. FIG. 2 is an illustration of such a system including a source node 210 and a router 200, both of which are configured to run the MLPPP protocol. The MLPPP bundle illustrated comprises three T3 links 215 and one T1 link 217 that is connected between the source 210 node and router 200. The source node 210 can be any node, such as a router or switch that is capable of supporting the MLPPP protocol. Router 200 preferably is an aggregation router that is configured to support the MLPPP protocol and implements the illustrated embodiment of the present invention.

Figure 3:
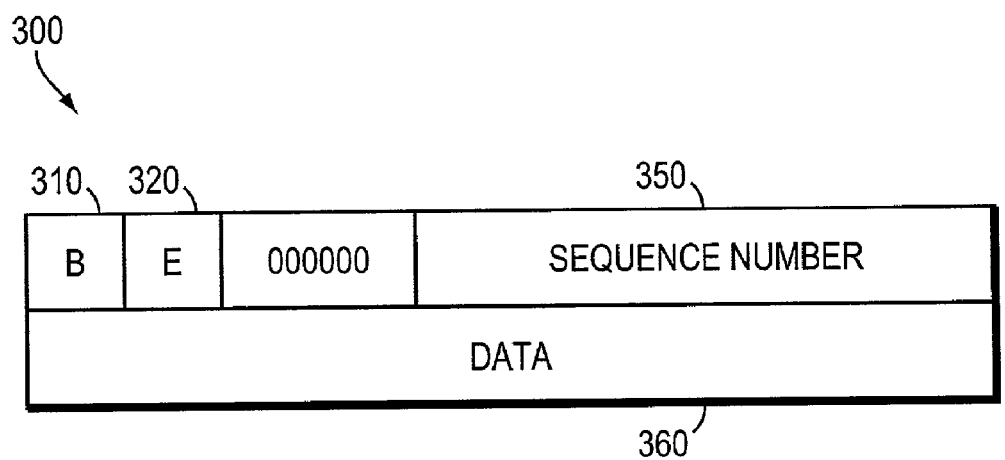
FIG. 3 is an illustration of a typical MLPPP packet.

FIG. 3 is an illustration of the MLPPP packet format that is used to encapsulate a data fragment. The illustrated format is defined in RFC 1990, *The PPP Multi-link Protocol*. A MLPPP packet 300 comprises a beginning fragment field 310, an ending fragment field 320, a sequence number field 350 and a data field 360.

The beginning (B) fragment field 310 is a one-bit field that holds an indicator that indicates the fragment is the first fragment derived from the PPP packet. If this field contains a one, the fragment is interpreted as being the first fragment of a PPP packet. This field is set to zero for all other fragments associated with the PPP packet.

The ending (E) fragment field 320 is a one-bit field that holds an indicator that indicates the fragment is the last fragment derived from the PPP packet. If this field contains a one, the fragment is interpreted as being the last fragment in the PPP packet. This field is set to zero for all other fragments associated with the PPP packet.

The sequence number field 350 is a 12-bit or 24-bit field that holds a sequence number that is associated with the fragment. The sequence number is incremented by one for every fragment that is transmitted. By default, the sequence field is 24 bits long, but can be negotiated to be only 12 bits.

The data field 360 holds the data fragment (fragment data) that was derived from the PPP packet.

FIG. 2 further illustrates the process of sending a PPP packet over a bundle using the MLPPP protocol. A PPP packet 220 is fragmented into a series of data fragments at the source node 210. Each data fragment is then encapsulated in an MLPPP packet. Encapsulation involves placing the data fragment in the data field, setting the beginning and ending fragment bits accordingly and assigning a sequence number. The MLPPP packet is then sent over the bundle 215, 217 to the router 200. When all the fragments for the PPP packet have been received, the router 200 reassembles the fragments to recreate the original PPP packet 220'.

Specifically, the PPP packet 220 is fragmented into five (5) fragments and encapsulated into MLPPP packets 300a, 300b, 300c, 300d and 300e at the source 210. The beginning fragment bit 310 is set in MLPPP packet 300a since it holds the first data fragment of the PPP packet 220. Likewise, the ending fragment bit 320 is set in the MLPPP is packet 300e because it holds the last data fragment of the PPP packet 220. The MLPPP packets are transmitted over the bundle 215a, 215b, 215c and 217 to the router 200 such that 300a and 300e are transmitted over the T3 link 215a, 300b is transmitted over the T3 link 215b, 300c is transmitted over the T3 link 215c and 300d is transmitted over the T1 link 217. The fragments 300a', 300b', 300c', 300d' and 300e' are received by the router 200 and when the final fragment has been received, the router 200 reassembles the fragments into the PPP packet 220' which is identical to the original PPP packet 220.

Figure 4:
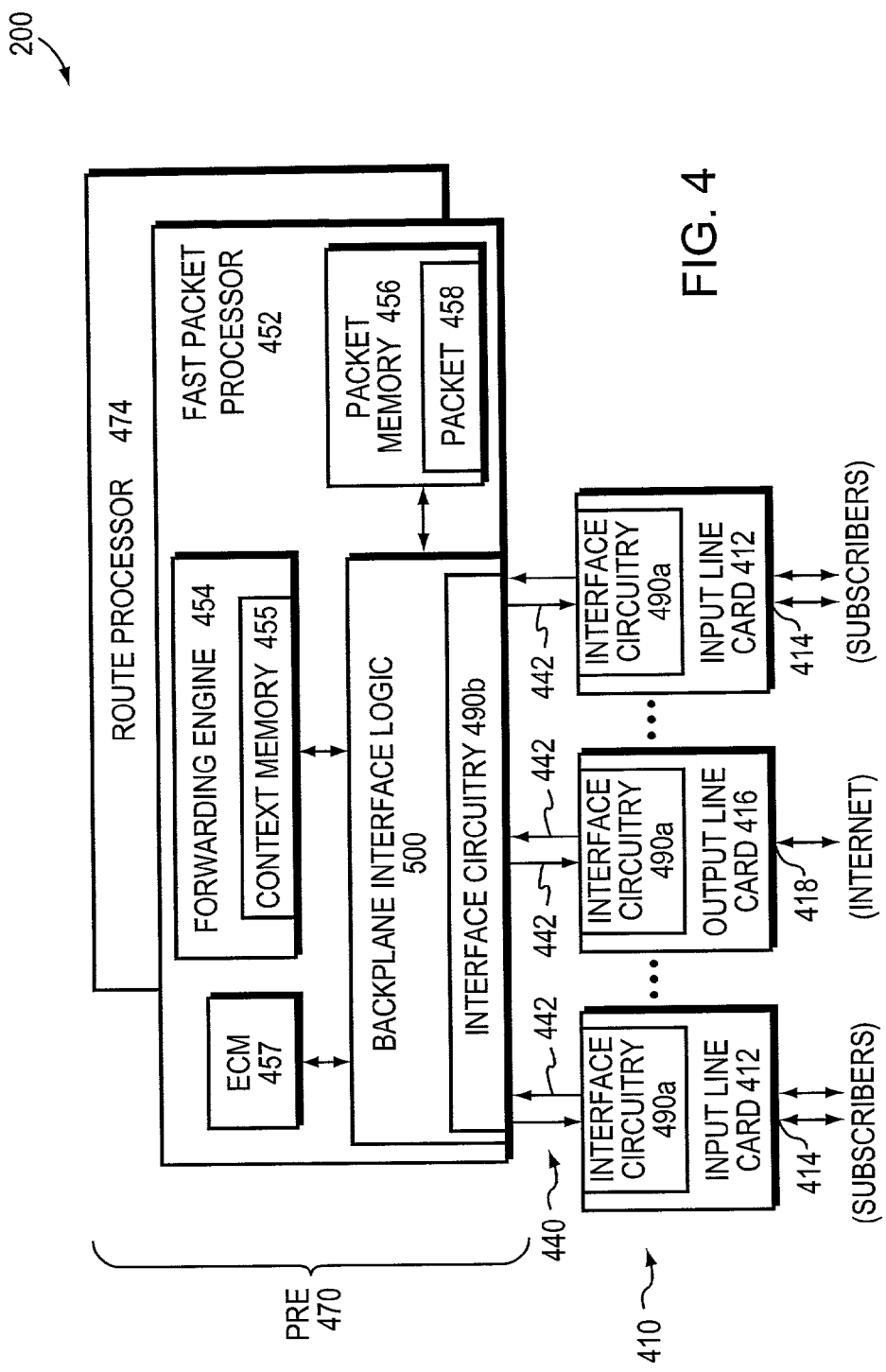
FIG. 4 is a schematic block diagram of an intermediate node, such as an aggregation or edge router that may advantageously implement the present invention.

FIG. 4 is a schematic block diagram of the router 200 that may be advantageously used to implement the present invention. The illustrated router 200 comprises a plurality of line cards 410 coupled to at least one performance routing engine (PRE) 470 via a unidirectional (i.e., point-to-point) interconnect system 440. The line cards 410 include a plurality of input cards 412 having input ports 414 and at least one output "trunk" card 416 configured to aggregate input data traffic over at least one output port 418. The line cards 410 are preferably configured to support interfaces and links of various data rates. For example, a line card may have a plurality of interfaces coupled to T3 links while another line card may have interfaces coupled to Gigabit Ethernet links. Each link may have multiple channels associated therewith.

The PRE 470 is an assembly comprising a fast packet "forwarding" processor (FP) module 452 and a route processor (RP) 474 adapted to perform packet forwarding and routing operations, respectively. The PRE assembly also provides quality of service (QoS) functions for complete packets received from each input line card 412 over the interconnect system 440. The interconnect system 440 comprises a plurality of high-speed unidirectional links 442 coupling the PRE 470 to each line card 410. The links are preferably clock forwarded links such that each unidirectional link comprises two data wires for transporting the data signals and one clock wire for carrying clock signals. However, it will be understood to those skilled in the art that the clock forwarding technique may scale to accommodate other clock forwarding arrangements such as, for example, four data wires for each accompanying clock wire.

The RP 474 comprises a general-purpose processor (not shown) such as, a MIPS route processor, coupled to a system controller (not shown) and memory (not shown). A network routing operating system, portions of which are typically resident in memory and executed by the route processor, functionally organizes the router by, inter alia, invoking network operations in support of software processes executing on the router. The route processor (RP) 474 is configured to initialize various areas of the FP module 452 including constructing and loading various tables used by the FP module 452. The RP 474 also performs configuration management functions of the edge router 200 and communicates with neighboring peer routers to exchange protocol data units used to construct the routing tables in accordance with conventional routing algorithms.

The FP module 452 is responsible for rendering forwarding decisions for the router and, to that end, includes a forwarding engine (FE) 454 (such as an arrayed processing engine) coupled to a high-performance backplane interface logic circuit 500. The FE 454 is preferably embodied as two high-performance, application specific integrated circuits (ASICs) having a plurality of processors arranged as four (4) one dimensional (1D) systolic array rows and eight (8) columns in a 4×8 arrayed configuration, wherein each column is coupled to a memory (not shown) called a column memory. However, it will be understood to those skilled in the art that other arrayed configurations, such as an 8×2 or 8×8 array, may be used in accordance with the present invention. The column memory preferably comprises synchronous dynamic random access memory (SDRAM) storage locations addressable by the FE 454 for storing software code and data structures accessed by the processors. The software code is preferably a binary, assembly language image or microcode adapted for execution by processors of the FE 454. It will be apparent to those skilled in the art that other memory means, including various computer readable media, may be used for storing and executing program instructions pertaining to the operation of the forwarding engine.

The edge router 200 illustratively includes sixteen (16) line cards 410, each of which may be configured to operate at various rates including but not limited to OC-12 (622 gigabits per second), DS0 and so on. The point-to-point links 442 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used is disclosed in co-pending and commonly-owned U.S. patent application Ser. No. 09/791,062, now issued as U.S. Pat. No. 6,973,072, titled High Performance Protocol for an Interconnect System of an Intermediate Network Node and is hereby included by reference in its entirety as though fully set forth herein.

Interface circuitry 490 coupled to the ends of the unidirectional links 442 is resident on both the line cards 410 and the backplane interface logic circuit 500. The backplane interface logic circuit 500 is also preferably embodied as a high performance ASIC, hereinafter referred to as the Cobalt ASIC, which is configured to further interface the line cards to a packet memory 456 of the FP module. The packet memory 456 preferably comprises SDRAM devices used to store packets 458 as the forwarding engine 454 determines where and when they should be forwarded within the router. For example, the packet memory 456 may be used to store low priority data packets while high priority, low latency voice packets are prioritized by the forwarding engine to an output card (e.g., the trunk card 416) of the router. An example of a backplane interface logic circuit that may be advantageously used with the present invention is disclosed in co-pending and commonly-owned U.S. patent application Ser. No. 09/791,063, titled High Performance Interface Logic Architecture of an Intermediate Network Device and is hereby included by reference in its entirety as though fully set forth herein.

The Cobalt ASIC 500 interfaces to an External Control Memory (ECM) 457. The ECM 457 is used to hold, among other things, free particle lists, free packet descriptor lists, a reassembly table and various packet descriptors. Preferably, the ECM 457 is implemented as a 32 Mbyte 16-bit wide double-data rate (DDR) random-access memory that operates on a 100 MHz to 200 MHz bus.

The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a protocol format for transmission from, for example, the Barium ASIC over the interconnect system 440 to the Cobalt ASIC. The ASICs also include circuitry to perform, among other things, cyclic redundancy code (CRC) generation and checking on packets, along with interconnect format checking.

Figure 5:
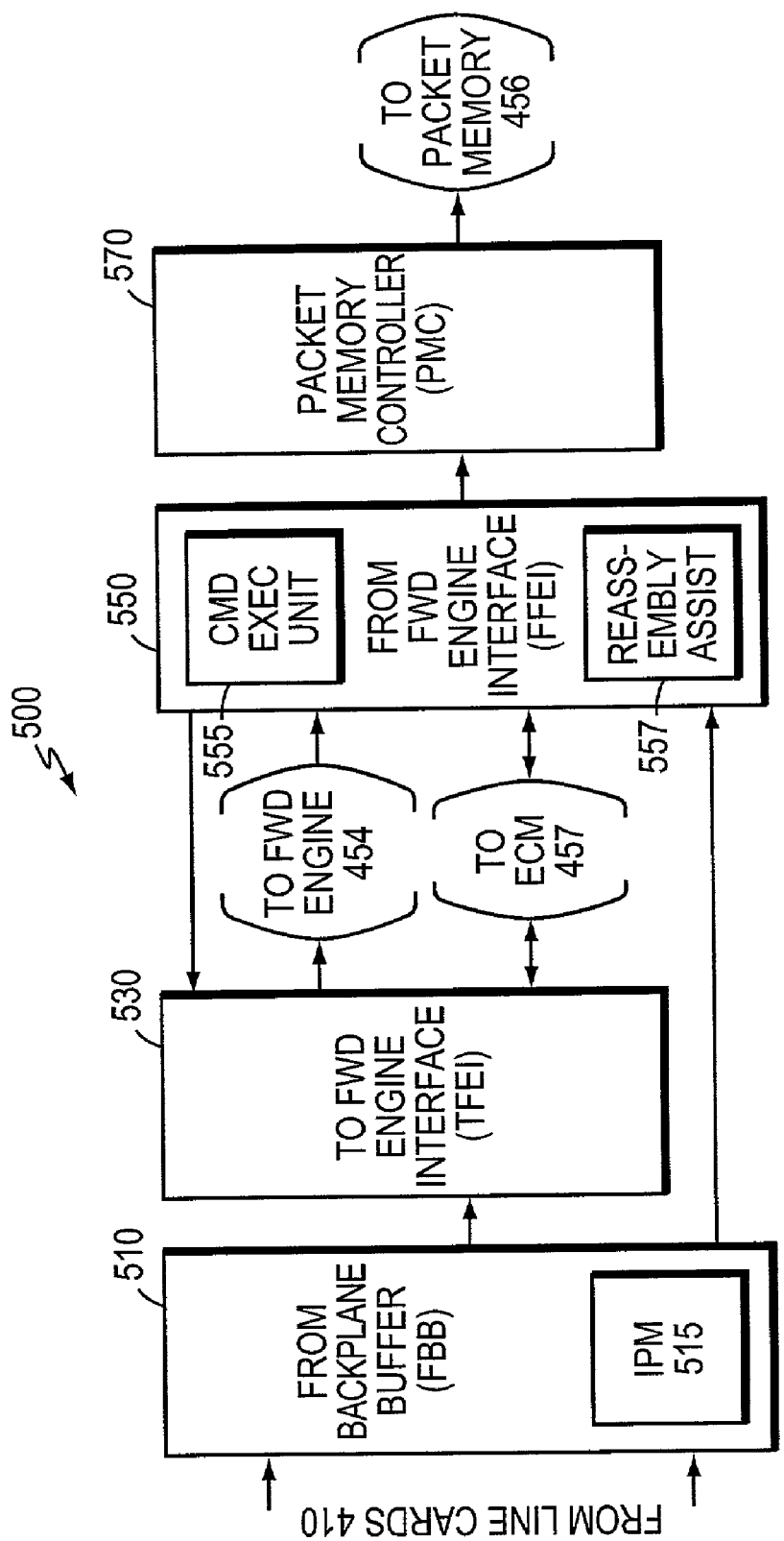
FIG. 5 is a partial functional block diagram of an application specific integrated circuit (ASIC) that implements the present invention.

FIG. 5 is a functional block diagram of a portion of the Cobalt ASIC 500. The functional blocks include a From Backplane Buffer (FBB) 510, an Internal Packet Memory (IPM) 515, a To Forwarding Engine Interface (TFEI) 530, a From Forwarding Engine Interface (FFEI) 550, a Command Execution Unit 555, a Reassembly Assist 557 and a Packet Memory Controller (PMC) 570.

The primary function of the FBB 510 is to interface the Cobalt ASIC 500 to the line cards 410. The FBB 510 serves as a speed-matching buffer to match the low data rate of the line cards to the higher speed data rate internal to the Cobalt ASIC 500. Data (packets) received from the line cards 410 are stored as packets by the FBB 510 in the internal packet memory (IPM) 515.

The TFEI 530 interfaces the Cobalt ASIC 500 to the forwarding engine 454. The TFEI 530 contains logic to provide speed matching between the Cobalt ASIC 500 and the forwarding engine 454. The TFEI 530 also generates various contexts that are used to communicate with the forwarding engine 454. These contexts include a new work context 610 (FIG. 6*a*) that is generated for each packet received. In addition for each packet received, the TFEI 530 allocates a packet descriptor 700 (FIG. 7) from the External Control Memory (ECM) 457.

The FFEI 550 receives processed contexts 650 (FIG. 6*b*) that are generated by the forwarding engine 454 and executes the commands contained in the contexts. Commands directed to the Command Execution Unit 555 are processed in the order in which they are received. These commands include commands that are used to control the packet buffer controller logic 570, commands that are directed to controlling access to the ECM 457, as well as commands used to control the reassembly assist logic 557.

The reassembly assist 557 provides a reassembly assist function to the forwarding engine 454. The reassembly assist 557 is controlled by commands issued by the forwarding engine 454 and is used to assist in the reassembly of packets.

The PMC 570 manages access to the external packet memory 456. The PMC is responsible for servicing requests to the packet memory from the FFEI 550.

Broadly stated, a packet is initially received at an input port 414 of a line card 412 and, after minimal buffering, is sent over a point-to-point link 442 to the Cobalt ASIC 500 where it is temporarily stored in the IPM 515. During normal packet processing, the Cobalt ASIC 500 sends an original header of the packet to the forwarding engine 454 for processing. Each processor has a limited amount of time (i.e., a phase of execution) to process its packet without impacting the flow of packets through the engine and adversely impacting packet throughput. The Cobalt ASIC holds the entire packet, both header and trailer, in the IPM 515 and does not perform any further processing of the packet until it is directed to do so by the forwarding engine 454.

For each packet received from a line card 410, the Cobalt ASIC 500 allocates a packet descriptor and generates a "new work" context.

Figure 7:
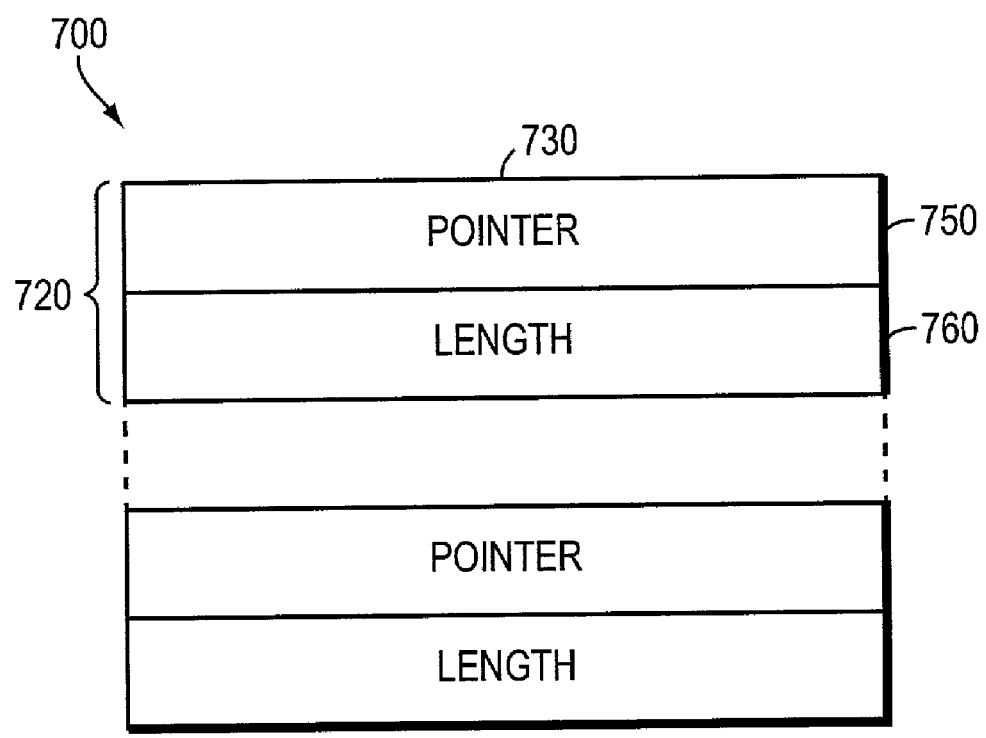
FIG. 7 is an illustration of packet descriptor that may be advantageously used with the present invention.

The packet descriptor allocated by the Cobalt ASIC 500 is used to describe the received packet. FIG. 7 is an illustration of a packet descriptor 700 that can be advantageously used with the present invention. The packet descriptor 700 may describe a packet or a fragment of a complete packet (i.e., a multi-link protocol packet). In the latter case, the packet descriptor that describes a fragment of a complete packet is herein referred to as a fragment packet descriptor. The packet descriptor 700 comprises one or more elements 720 each element comprising at least a pointer field 750 and a length field 760. The pointer field 750 holds a pointer to an area of in the packet memory 456 where data associated with the packet is stored. The length field 760 holds the length of the packet. Collectively, elements 720 in their entirety describe the packet.

Figure 6A:
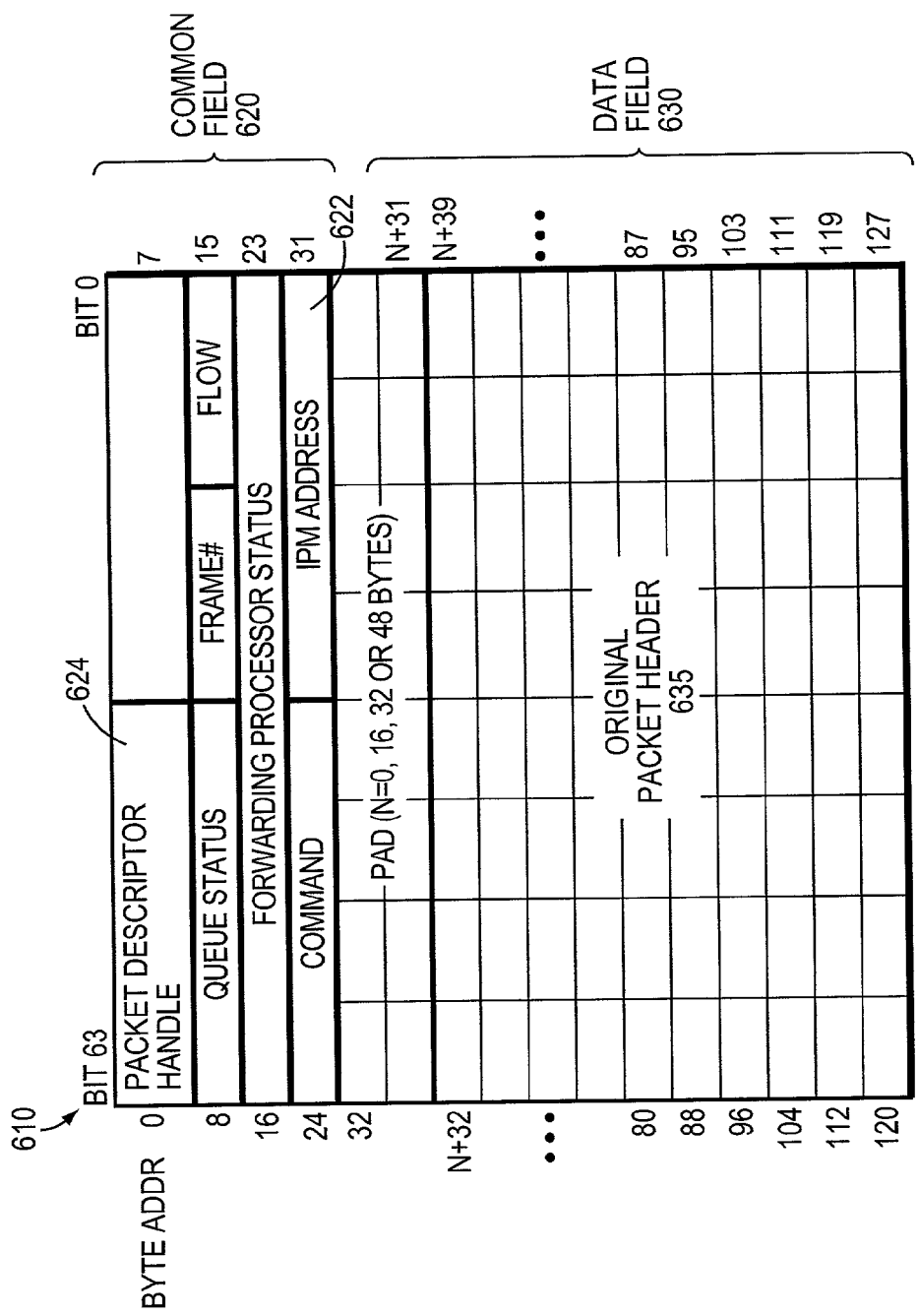
FIG. 6a is a schematic block diagram of a new work context that may be advantageously used with the present invention.

The new work context generated by the Cobalt ASIC 500 is used to notify the forwarding engine 454 that a complete new packet is available in the IPM 515. FIG. 6*a* is a schematic block diagram of the new work context 610 that, illustratively, is 128 bytes in length. A 32-byte common field 620 contains various state information, such as queue status, frame number and forwarding processor status. Also included within the common field 620 is an IPM address field 622 that is set to the original starting address of the complete MLPPP packet that is stored in the IPM 515 and a packet descriptor handle field 624 (packet handle) that contains a pointer to the packet descriptor 700 (i.e., fragment packet descriptor) allocated for the MLPPP packet. The remainder of the context, i.e., a data field 630, accommodates the MLPPP packet header 635 that is copied into the context by the Cobalt ASIC 500. The new work context is delivered to the forwarding engine 454 where it is processed and a "processed" context is generated.

Figure 6B:
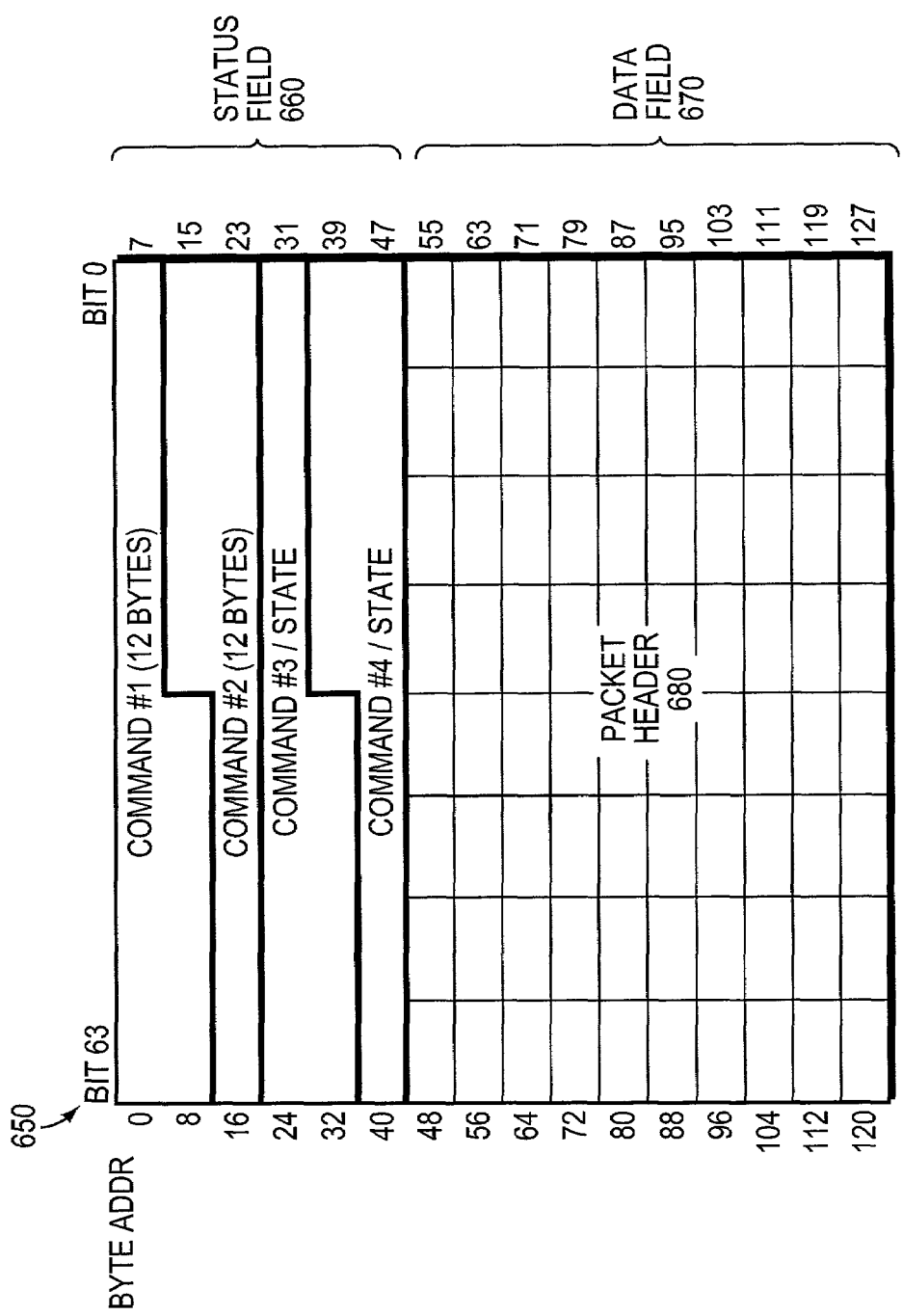
FIG. 6b is schematic block diagram of a processed context that may be advantageously used with the present invention.

FIG. 6*b* is a schematic block diagram of a processed context 650. A status field 660 of the context typically contains a plurality of commands that are preferably executed in order, starting with command #1. The commands typically instruct the Command Execution Unit 555 to move the packet header 680 (stored in data field 670) from the processed context 650, along with the associated packet trailer from the IPM 515 at the computed starting address, to the packet memory 456. In addition, the processor 454 typically includes "other" commands in the processed context to further direct the operation of the Cobalt ASIC 500. These other commands include commands that control the reassembly assist function 557.

Specifically, the processor 454 maintains a reassembly table 820 (FIG. 8*a*) to track fragments received on a bundle. For each fragment received, the processor 454 preferably issues a command that directs the reassembly assist 557 to place an entry, associated with the fragment, in the table 820. Once all the fragments for a packet have been received, the processor issues a command to direct the reassembly assist 557 to recreate the original packet from these reassembly table entries.

Figure 8A:
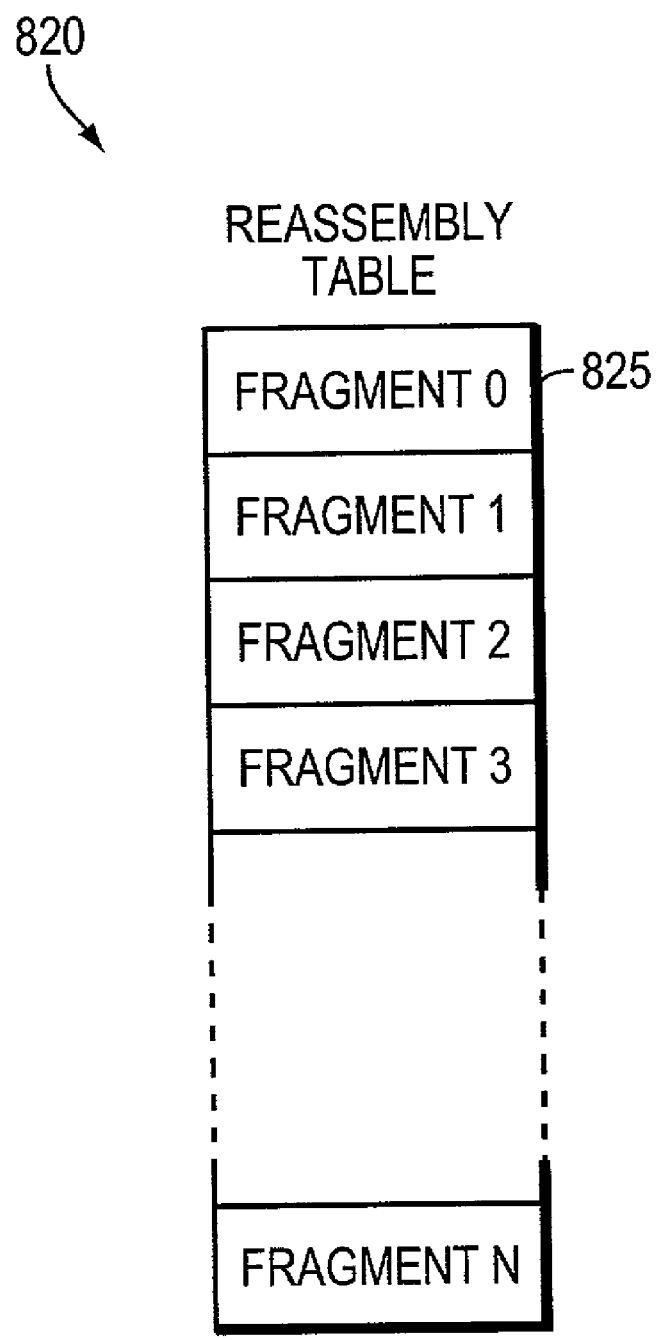
FIG. 8a is an illustration of a reassembly table that may be advantageously used to implement the present invention.

FIG. 8*a* is an illustration of the reassembly table 820 comprising a plurality of elements 825 each of which holds a pointer to a fragment packet descriptor 700. Preferably, the reassembly table is organized as an array wherein each element is fixed in size and entries associated with a PPP packet comprise a contiguous number of entries. The number of contiguous elements dedicated for a given bundle depends on the differential delay between the links of the bundle, the number of links in the router and the maximum number of links in a bundle. FIG. 8*b* is a table 850 of reassembly table size values that can be used with the present invention. In the illustrated embodiment, the table 850 shows the reassembly table size for various bundles sizes assuming approximately 2500 T1 links configured to support MLPPP.

The reassembly table is preferably implemented as an external memory that has a 16-bit wide data bus and runs at 100 to 200 MHz DDR random-access memory. The memory is 4 megabytes (MB) in size allowing for 512K entries wherein each entry is 8 bytes in length.

Operationally, each MLPPP packet received by the Cobalt ASIC 500 is stored in the IPM 515. The TFEI 530 allocates a fragment packet descriptor 700 from the external control memory (ECM) 457 for the MLPPP packet and generates a new work context 610 that is then sent to the processor 454.

As noted, the new work context 610 is used to notify the forwarding engine 454 that a complete new packet is available in the IPM 515. The MLPPP header is copied into the original packet header field 635 of the new work context. In addition, a pointer to the fragment packet descriptor is copied to the packet handle field 624 (packet handle) and the address in of the MLPPP packet in the IPM 515 is copied to the IPM address field 622. The new work context 610 is then passed to the forwarding engine 454 where it is stored in a context memory 455 associated with each processor of the engine 454.

The forwarding engine 454 uses the MLPPP header information in the new work context to track the fragments that are received. Tracking a fragment includes keeping a copy of the packet handle 624 in the reassembly table 820 and maintaining a bit map that indicates whether or not a given fragment has been received.

A copy of the packet handle 624 is placed in the reassembly table 820 by using the sequence number 550 as an index to select an entry 825 in the reassembly table 820 and copying the packet handle 624 to the selected entry. Preferably, this copy operation is performed using a command stored in the processed context that directs the Cobalt ASIC to move the packet handle to the appropriate reassembly table 820 location.

For the first fragment of the PPP packet (indicated by the beginning fragment bit in the MLPPP header), the forwarding engine 454 saves the sequence number 550 associated with the packet. In addition for each fragment, the forwarding engine maintains 2 bits to indicate whether or not the fragment has been received and whether or not the fragment is last fragment of the PPP packet. The processor uses this information to keep track of the incoming fragments and determine when all the fragments for a given PPP packet have been received. Preferably, the bit information for all of the fragments is kept in a bit map that is indexed by the sequence number 550. The sequence number 550 associated with the first fragment of the PPP packet is used with the sequence number 550 associated with the last fragment of the PPP packet to determine the range of fragments that comprise the PPP packet. By examining the entries in the bit map that fall within this range, the forwarding processor can determine if all of the fragments for the PPP packet have been received.

Figure 9:
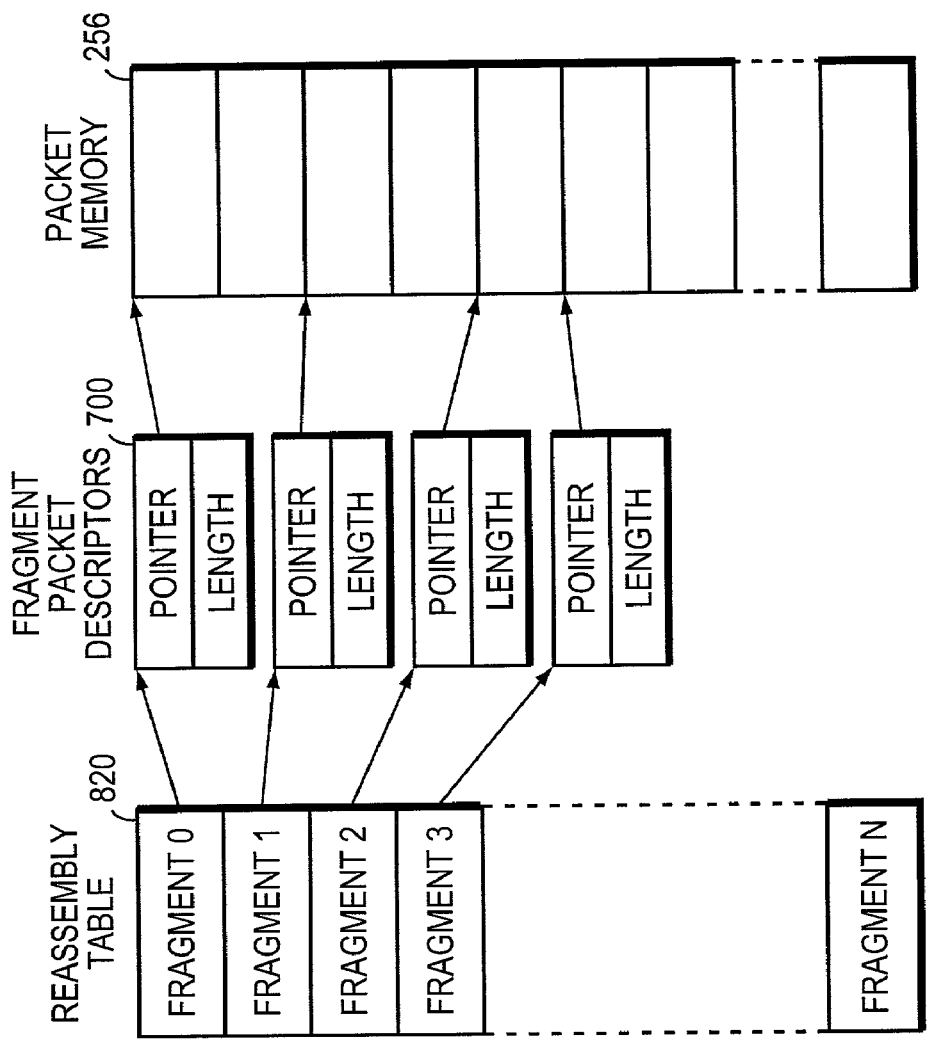
FIG. 9 is an illustration of the relationships between the reassembly table, fragment packet descriptors and packet memory that may be advantageously used to implement the present invention.

FIG. 9 illustrates the interaction between the reassembly table 820, the fragment packet descriptors 700 and the packet memory 256 for a single bundle. The reassembly table 820 comprises a plurality of entries each of which points to a fragment packet descriptor 700 that is associated with a received fragment stored in the packet memory 256.

Assume, for example, that the sequence number 550 associated with the first (beginning) fragment of a PPP packet is zero. The reassembly table 820, in this example, is organized such that the first entry (i.e., "Fragment 0") points to the packet descriptor 700 of the beginning fragment of the PPP packet, the next entry (i.e., "Fragment 1") points to (references) the fragment packet descriptor of the next fragment of the PPP packet, and so on. The fragment packet descriptors 700 contain information that describes the received fragments stored in the packet memory.

When the processor 454 has received the final fragment of the PPP packet, it issues a request to the reassembly assist to reassemble the received fragments into a packet. Included in the request is an index and a length value. The index is an index to the entry in the reassembly table that is associated with the first fragment of the PPP packet. The length value is a count of the total number of entries in the reassembly table that are associated with the PPP packet.

Figure 10:
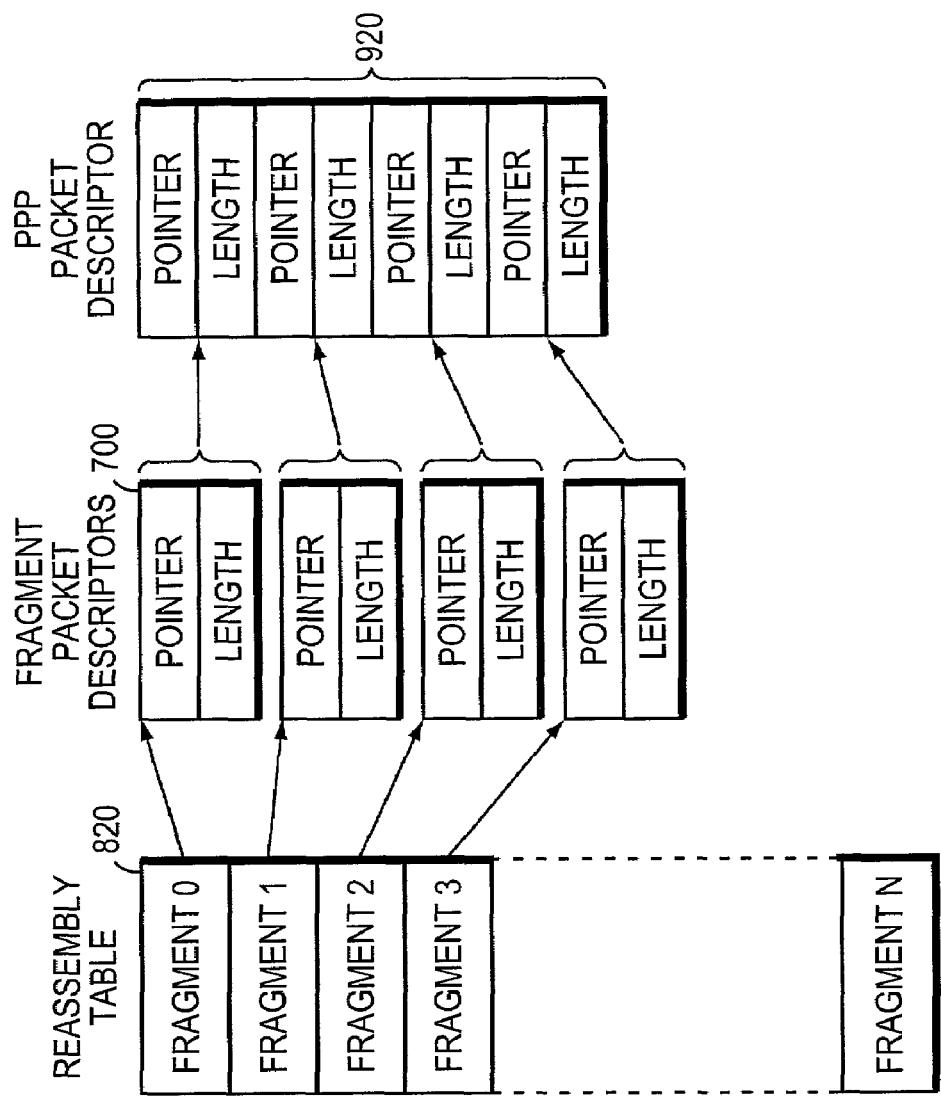
FIG. 10 is an illustration of the packet reassembly process as implemented in the illustrated embodiment of the present invention.

FIG. 10 is an illustration of the reassembly process as performed by the reassembly assist 557. When a request is received, the reassembly assist 557 allocates a packet descriptor 920 that is used to describe the reassembled packet. It then processes the fragment entries in the reassembly table 820, starting with the first entry indicated in the request by the index value and continuing for the number of entries specified in the request by the length value.

Figure 11:
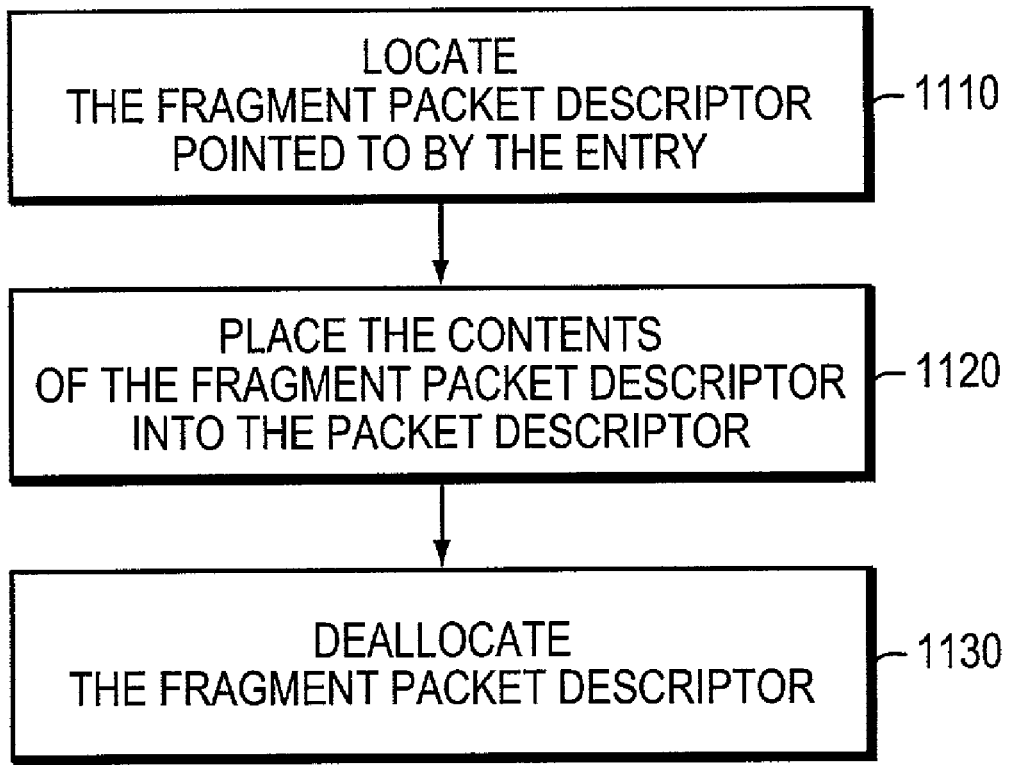
FIG. 11 is a block diagram that illustrates the processing the reassembly assist performs for each entry that can be advantageously used to implement the present invention.

FIG. 11 is a block diagram that illustrates the process the reassembly assist preferably performs for each entry in the reassembly table associated with the packet being reassembled. This block diagram can be advantageously used to implement the present invention. At 1110, the fragment packet descriptor pointed to by the reassembly table entry is located using the pointer 750 stored in the reassembly table entry. Once the fragment packet descriptor is located, at 1120, the contents of the fragment packet descriptor are then placed in the packet descriptor 920 of the PPP packet. Finally, at 1130, the reassembly assist deallocates the fragment packet descriptor. Deallocating the fragment packet descriptor returns the fragment packet descriptor to the packet descriptor free pool, thus enabling the fragment packet descriptor to be reused.

On completing this process for all fragments in the reassembly table associated with the reassembled packet, the packet descriptor 920 contains an ordered (reassembled) list of packet descriptors that describes all of the fragments of the original PPP packet. This packet descriptor 920 represents (describes) the assembled PPP packet.

It should be noted that the illustrated embodiment of the present invention is described in a manner that would enable one skilled in the art to implement the present invention in hardware. However, this is not a limitation of the invention. The described technique employed by the present invention can be implemented in whole or in part in computer readable and executable program instructions using well-known techniques known to persons skilled in the art of software development.

For example, the technique performed by the reassembly assist could be performed in whole or in part as a detached software process (task), portions of which are typically resident in a computer memory and executed on a processor. It will be apparent to those skilled in the art that other memory means, including various computer readable media, may be used for storing and executing program instructions pertaining to the described mechanism and technique. The task could be configured to communicate with the forwarding processor's microcode using well-known methods for inter-task communication. For example, requests to reassemble packets could be issued in the form of a message.

Advantageously, the inventive technique described herein enables a processor to reassemble a fragmented packet in a deterministic manner. The inventive technique only requires the processor to issue a single instruction to reassemble a packet. In addition, the inventive mechanism provides a technique for reassembling a packet without having to read the contents of each fragment and combine them, thereby conserving valuable memory bandwidth. The advantages provided by the described inventive technique described enables a systolic processor that is limited to performing its processing within a defined phase to perform a packet reassembly function.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for reassembling a packet by a network device, the method comprising the steps of:
    locating a fragment packet descriptor associated with the packet, the fragment packet descriptor including a pointer to an area of memory where data of a fragment is stored; and
    placing the contents of the fragment packet descriptor in a packet descriptor associated with the packet, the packet descriptor descriptive of the entire packet.

2. The method of claim 1 wherein the step of locating a fragment packet descriptor associated with the packet further comprises:
    locating an entry in a reassembly table associated with the packet; and
    dereferencing a pointer held in the entry to locate the fragment packet descriptor.

3. The method of claim 1 further comprising the steps of:
    receiving a request to reassemble the packet.

4. The method of claim 3 wherein the request comprises:
    an index to an entry in a reassembly table that is associated with the first fragment of the packet; and
    a length value that is a count of the total number of entries in the reassembly table that are associated with the packet.

5. The method of claim 1 further comprising the step of:
    deallocating the fragment packet descriptor.

6. A computer readable medium that includes instructions executable on a computer for reassembling a packet, the instructions comprising instructions configured to:
    locate a fragment packet descriptor associated with the packet, the fragment packet descriptor including a pointer to an area of memory where data of a fragment is stored; and
    place the contents of the fragment packet descriptor in a packet descriptor associated with the packet, the packet descriptor descriptive of the entire packet.

7. An apparatus for reassembling a packet, the apparatus comprising:
    means for locating a fragment packet descriptor associated with the packet, the fragment packet descriptor including a pointer to an area of memory where data of a fragment is stored; and
    means for placing the contents of the fragment packet descriptor in a packet descriptor associated with the packet, the packet descriptor descriptive of the entire packet.

8. The apparatus of claim 7 further comprising:
    means for locating an entry in a reassembly table associated with the packet; and
    means for dereferencing a pointer held in the entry to locate the fragment packet descriptor.

9. The apparatus of claim 7 further comprising:
    means for receiving a request to reassemble the packet.

10. The apparatus of claim 7 further comprising:
    means for deallocating the fragment packet descriptor.

11. A method for reassembling a packet by a network device, the method comprising the steps of:
    receiving a plurality of fragments associated with the packet;
    determining if all the fragments for the packet have been received;
    issuing a request to reassemble the packet to a reassembly assist function if all the fragments for the packet have been received; and
    placing, by the reassembly assist function, contents of fragment packet descriptors into a packet descriptor, the packet descriptor descriptive of the entire packet.

12. The method of claim 11 wherein the request comprises:
    an index to an entry in a reassembly table that is associated with the first fragment of the packet; and
    a length value that is a count of the total number of entries in the reassembly table that are associated with the packet.

13. The method of claim 11 wherein the step of determining if all fragments for the packet have been received further comprising:
    examining a bit map that indicates whether or not the fragments have been received.

14. The method of claim 11 further comprising the step of:
    tracking a fragment of the packet.

15. The method of claim 14 wherein the step of tracking a fragment of the packet further comprising the steps of:
    keeping a copy of a packet handle associated with the fragment in a reassembly table; and
    maintaining a location in a bit map that indicates whether or not the fragment has been received.

16. A computer readable medium containing instructions for execution on a computer for reassembling a packet, the instructions comprising instructions configured to:
    receive a plurality of fragments associated with the packet;
    determine if all the fragments for the packet have been received;
    issue a request to reassemble the packet to a reassembly assist function if all the fragments for the packet have been received; and
    place, by the reassembly assist function, contents of fragment packet descriptors into a packet descriptor, the packet descriptor descriptive of the entire packet.

17. An apparatus for reassembling a packet, the apparatus comprising:
    means for receiving a plurality of fragments associated with the packet;
    means for determining if all the fragments for the packet have been received;
    means for issuing a request to reassemble the packet if all the fragments for the packet have been received; and
    means for placing contents of fragment packet descriptors into a packet descriptor, the packet descriptor descriptive of the entire packet.

18. The apparatus of claim 17 further comprising:
    means for examining a bit map that indicates whether or not the fragments have been received.

19. The apparatus of claim 17 further comprising:
    means for tracking a fragment of the packet.

20. The apparatus of claim 19 further comprising:
    means for keeping a copy of a packet handle associated with the fragment in a reassembly table; and
    means for maintaining a location in a bit map that indicates whether or not the fragment has been received.

21. A system for reassembling a packet, the system comprising:
a processor; and
a reassembly assist function configured to communicate with the processor;
wherein the processor receives a plurality of fragments associated with the packet, determines if all the fragments for the packet have been received and issues a request to reassemble the packet to the reassembly assist function to reassemble the packet, and the reassembly assist function places contents of fragment packet descriptors into a packet descriptor associated with the packet, the packet descriptor descriptive of the entire packet.

22. A method for reassembling a packet, the method comprising the steps of:
receiving a fragment packet having a fragment packet descriptor associated therewith;
placing the contents of the fragment packet descriptor in a reassembly table associated with the packet;
in response to receiving all the fragments for the packet, issuing a request to a reassembly assist function; and
placing, by the reassembly assist function, the contents of the fragment packet descriptor into a packet descriptor, the packet descriptor descriptive of the entire packet.

23. The method of claim 22, further comprising the step of:
determining if all fragments have been received.

24. A network device for reassembling a packet, comprising:
means for receiving a fragment packet having a fragment packet descriptor associated therewith;
means for placing the contents of the fragment packet descriptor in a reassembly table associated with the packet;
means for issuing a request to reassemble the packet, in response to receiving all the fragments for the packet; and
means for placing the contents of the fragment packet descriptor into a packet descriptor, the packet descriptor descriptive of the entire packet.

25. The apparatus of claim 24, further comprising:
means for determining if all fragments have been received.

26. A system for reassembling a packet, comprising:
a processor configured to receive a fragment packet having a fragment packet descriptor associated therewith;
a reassembly assist function configured to communicate with the processor, the reassembly assist function adapted to locate the fragment packet descriptor associated with the packet;
the processor configured to store a reassembly table, the reassembly table storing the contents of the fragment packet descriptor in a packet descriptor wherein the packet descriptor is descriptive of the entire packet; and
the processor configured to, in response to receiving all the fragments for the packet, issue a request to the reassembly assist function.

27. The system of claim 26, wherein the reassembly assist function is further configured to determine if all fragments have been received.

28. A computer readable media having instructions written thereon for execution on a computer processor for reassembling a packet, the instructions comprising instructions for:
receiving a fragment packet having a fragment packet descriptor associated therewith;
placing the contents of the fragment packet descriptor in a reassembly table associated with the packet; and
in response to receiving all the fragments for the packet, issuing a request to a reassembly assist function; and
placing, by the reassembly assist function, the contents of the fragment packet descriptor into a packet descriptor, the packet descriptor descriptive of the entire packet.

29. The method of claim 1, wherein the steps of locating and placing are performed by a reassembly assist function that operates autonomously from a packet processor of the network device.

* * * * *